United States Patent
Sautter et al.

(10) Patent No.: US 10,543,771 B2
(45) Date of Patent: Jan. 28, 2020

(54) VEHICLE ROOFTOP RACK ASSEMBLY

(71) Applicant: Yakima Products, Inc., Lake Oswego, OR (US)

(72) Inventors: Chris Sautter, Portland, OR (US); Warren E. Stoneburner, Portland, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 46 days.

(21) Appl. No.: 15/614,400

(22) Filed: Jun. 5, 2017

(65) Prior Publication Data

US 2017/0349080 A1 Dec. 7, 2017

Related U.S. Application Data

(60) Provisional application No. 62/345,835, filed on Jun. 5, 2016.

(51) Int. Cl.
| | | |
|---|---|---|
| B60P 3/00 | (2006.01) | |
| B60P 3/34 | (2006.01) | |
| E04H 15/06 | (2006.01) | |

(52) U.S. Cl.
CPC ............... B60P 3/34 (2013.01); E04H 15/06 (2013.01)

(58) Field of Classification Search
CPC ............. B60P 3/34; B60P 3/38; E04H 15/006
USPC ........................................................ 224/321
See application file for complete search history.

(56) References Cited

U.S. PATENT DOCUMENTS

| | | | |
|---|---|---|---|
| 1,433,741 | A | 10/1922 | Parker |
| 1,789,458 | A | 1/1931 | Bureau |
| 2,248,170 | A | 7/1941 | Hansen |
| 2,302,300 | A | 11/1942 | Davies |
| 2,444,422 | A | 7/1948 | Bradford |
| 2,536,797 | A | 1/1951 | Cooke |
| 2,551,218 | A | 5/1951 | Menne |
| 2,573,187 | A | 10/1951 | Désilets |
| 2,723,005 | A | 11/1955 | Wink |
| 2,729,499 | A | 1/1956 | Eggum |
| 2,816,672 | A | 12/1957 | Facchini |
| 2,988,253 | A | 6/1961 | Menghi |
| 3,001,679 | A | 9/1961 | Canning et al. |

(Continued)

FOREIGN PATENT DOCUMENTS

| | | |
|---|---|---|
| AU | 3185177 A | 6/1979 |
| AU | 6617486 A | 6/1988 |

(Continued)

OTHER PUBLICATIONS

The U.S. Receiving Office of WIPO, International Search Report and Written Opinion of the International Searching Authority regarding PCT Patent Application No. PCT/US2017/036000 dated Aug. 30, 2017, 11 pages.

(Continued)

*Primary Examiner* — Peter N Helvey
(74) *Attorney, Agent, or Firm* — Kolisch Hartwell, P.C.

(57) ABSTRACT

An assembly for mounting a platform to a vehicle rooftop is disclosed. The assembly includes a rail mounted on a bottom side of the platform, having a linear track. A clamp assembly is slidably mounted in the linear track, and is configured to grip a crossbar. The clamp assembly includes a fixation device configured to stop movement of the clamp assembly in a selected position along the track.

15 Claims, 12 Drawing Sheets

(56) References Cited

U.S. PATENT DOCUMENTS

| | | |
|---|---|---|
| 3,005,213 A | 10/1961 | Brown et al. |
| 3,042,240 A | 7/1962 | Cline |
| 3,113,642 A | 12/1963 | Lay |
| 3,155,249 A | 11/1964 | Johnson |
| 3,172,418 A | 3/1965 | Pollard |
| 3,186,569 A | 6/1965 | Roux |
| 3,190,587 A | 6/1965 | Fries |
| 3,276,085 A | 10/1966 | Spranger |
| 3,375,836 A | 4/1968 | Domeneghetti |
| 3,460,694 A | 8/1969 | Simms |
| 3,469,810 A | 9/1969 | Dorris |
| 3,596,788 A | 8/1971 | Willie |
| 3,628,825 A | 12/1971 | Hannoosh |
| 3,462,157 A | 2/1972 | Williams, Jr. |
| 3,661,418 A | 5/1972 | Stewart |
| 3,737,083 A | 6/1973 | Lund |
| 3,740,034 A | 6/1973 | Scroggins |
| 3,742,966 A | 7/1973 | Franzen |
| 3,763,607 A | 10/1973 | Glover |
| 3,777,922 A | 12/1973 | Kirchmeyer |
| 3,826,390 A | 7/1974 | Watson |
| 3,828,993 A | 8/1974 | Carter |
| 3,845,775 A | 11/1974 | Norris et al. |
| 3,861,533 A | 1/1975 | Radek |
| 3,861,572 A | 1/1975 | Norris et al. |
| 3,870,061 A | 3/1975 | Lowery |
| 3,892,455 A | 7/1975 | Sotolongo |
| 3,946,917 A | 3/1976 | Crawford et al. |
| 3,968,809 A | 7/1976 | Beavers |
| 3,976,213 A | 8/1976 | Ball |
| 3,993,167 A | 11/1976 | Reed |
| 4,022,362 A | 5/1977 | Revercomb |
| 4,023,761 A | 5/1977 | Molis |
| 4,034,879 A | 7/1977 | Cudmore |
| 4,050,732 A | 9/1977 | MacIsaac |
| 4,058,243 A | 11/1977 | Tappan |
| 4,081,118 A | 3/1978 | Mason |
| 4,085,763 A | 4/1978 | Thomas |
| 4,114,633 A | 9/1978 | Herbez |
| 4,191,418 A | 3/1980 | Ladegast, Jr. |
| 4,222,400 A | 9/1980 | Reimer |
| 4,326,655 A | 4/1982 | Gradek et al. |
| 4,333,679 A | 6/1982 | Hardy et al. |
| 4,350,380 A | 9/1982 | Williams |
| 4,358,037 A | 11/1982 | Heideman |
| 4,402,442 A | 9/1983 | Martino |
| 4,589,622 A | 5/1986 | Hutter |
| 4,630,990 A | 12/1986 | Whiting |
| 4,657,300 A | 4/1987 | Penny et al. |
| 4,717,165 A | 1/1988 | Johnson |
| 4,751,891 A | 6/1988 | Wilson |
| 4,754,774 A | 7/1988 | Leader |
| 4,817,838 A | 4/1989 | Kamaya |
| 4,830,036 A | 5/1989 | Sanders |
| 4,830,249 A | 5/1989 | Mirenda et al. |
| 4,848,794 A | 7/1989 | Mader et al. |
| 4,892,279 A | 1/1990 | Lafferty et al. |
| 4,895,096 A | 1/1990 | Goodwin et al. |
| 4,960,356 A | 10/1990 | Wrenn |
| 4,961,524 A | 10/1990 | Hunts |
| 4,962,843 A | 10/1990 | Ouellette |
| 4,968,086 A | 11/1990 | Macisaac |
| 4,976,123 A | 12/1990 | Ceron et al. |
| 4,997,332 A | 3/1991 | Johnson |
| 5,118,020 A | 6/1992 | Piretti |
| 5,119,654 A | 6/1992 | Ceron et al. |
| 5,123,147 A | 6/1992 | Blair |
| 5,131,669 A | 7/1992 | Kinnamon et al. |
| 5,136,709 A | 8/1992 | Shirakabe et al. |
| 5,137,195 A | 8/1992 | Walter |
| 5,181,639 A | 1/1993 | Kvänna |
| 5,215,233 A | 6/1993 | Baldeck |
| 5,217,149 A | 6/1993 | Simonett |
| 5,226,570 A | 7/1993 | Pedrini |
| 5,275,320 A | 1/1994 | Duemmler |
| 5,280,801 A | 1/1994 | Brosman |
| 5,313,972 A | 5/1994 | Goldberg |
| 5,346,355 A | 9/1994 | Riemer |
| 5,360,150 A | 11/1994 | Praz |
| 5,388,938 A | 2/1995 | Helton |
| 5,416,957 A | 5/1995 | Renzi, Sr. et al. |
| 5,442,840 A | 8/1995 | Ewald |
| 5,445,300 A | 8/1995 | Eipper et al. |
| 5,456,396 A | 10/1995 | Allen |
| 5,492,258 A | 2/1996 | Brunner |
| 5,516,017 A | 5/1996 | Arvidsson |
| 5,526,971 A | 6/1996 | Despain |
| 5,535,930 A | 7/1996 | Lee |
| 5,582,044 A | 12/1996 | Bolich |
| 5,598,959 A | 2/1997 | Lorensen et al. |
| 5,617,617 A | 4/1997 | Gustin |
| 5,628,336 A | 5/1997 | Lee |
| 5,647,522 A | 7/1997 | Routh |
| 5,657,913 A | 8/1997 | Cucheran et al. |
| D384,324 S | 9/1997 | Barker |
| D386,145 S | 11/1997 | Staller |
| 5,692,659 A | 12/1997 | Reeves |
| 5,701,628 A | 12/1997 | Morad |
| 5,713,589 A | 2/1998 | Delgado et al. |
| 5,738,258 A | 4/1998 | Farrow et al. |
| 5,758,810 A | 6/1998 | Stapleton |
| 5,769,291 A | 6/1998 | Chasan |
| 5,769,292 A | 6/1998 | Cucheran et al. |
| 5,775,557 A | 7/1998 | Arvidsson |
| 5,779,119 A | 7/1998 | Talbot et al. |
| 5,806,735 A | 9/1998 | Christiansson et al. |
| 5,810,226 A | 9/1998 | Lee |
| 5,833,074 A | 11/1998 | Phillips |
| 5,845,828 A | 12/1998 | Settelmayer |
| 5,868,621 A | 2/1999 | Parsons |
| 5,951,231 A | 9/1999 | Allen |
| 5,988,195 A | 11/1999 | Kaestner et al. |
| 5,992,805 A | 11/1999 | Tanner |
| 5,996,736 A | 12/1999 | Stankiewicz |
| 6,015,074 A | 1/2000 | Snavely et al. |
| 6,035,875 A | 3/2000 | Chen |
| 6,053,336 A | 4/2000 | Reeves |
| 6,070,891 A | 6/2000 | Knautz et al. |
| 6,131,781 A | 10/2000 | Murray |
| 6,164,507 A | 12/2000 | Dean et al. |
| 6,189,868 B1 | 2/2001 | Santelli, Jr. |
| 6,193,252 B1 | 2/2001 | Lin |
| 6,283,310 B1 | 9/2001 | Dean et al. |
| 6,357,643 B1 | 3/2002 | Janner et al. |
| 6,385,822 B1 | 5/2002 | Dean et al. |
| 6,422,441 B1 | 7/2002 | Settelmayer et al. |
| 6,439,397 B1 | 8/2002 | Reeves |
| 6,460,753 B1 | 10/2002 | Edgerly et al. |
| 6,494,351 B1 | 12/2002 | Dean |
| 6,561,398 B1 | 5/2003 | Cole et al. |
| 6,622,898 B1 | 9/2003 | Wang |
| 6,681,972 B1 | 1/2004 | Laverack et al. |
| 6,715,653 B2 | 4/2004 | DeCosta |
| 6,769,292 B2 | 8/2004 | Mansky et al. |
| 6,793,186 B2 | 9/2004 | Pedersen |
| 6,868,998 B2 | 3/2005 | Dean |
| 6,918,521 B2 | 7/2005 | Settelmayer et al. |
| 6,972,042 B2 | 12/2005 | Benson |
| 7,000,811 B2 | 2/2006 | Gilstrap et al. |
| 7,036,698 B2 | 5/2006 | Allen |
| 7,044,347 B1 | 5/2006 | Pedrini |
| 7,051,909 B2 | 5/2006 | Gibson |
| 7,131,561 B2 | 11/2006 | Humes |
| 7,178,536 B2 | 2/2007 | Holtkamp |
| 7,234,617 B2 | 6/2007 | Weaver et al. |
| 7,240,684 B2 | 7/2007 | Yang |
| 7,258,260 B2 | 8/2007 | Hurd |
| 7,357,283 B2 | 4/2008 | Settelmayer |
| 7,367,481 B2 | 5/2008 | Barbara |
| 7,416,098 B2 | 8/2008 | Settelmayer et al. |
| 7,726,528 B2 | 6/2010 | Foley |
| 8,020,737 B2 | 9/2011 | Sweeney |
| 8,021,169 B1 | 9/2011 | Smith |
| 8,136,708 B2 | 3/2012 | Sautter et al. |

(56) References Cited

U.S. PATENT DOCUMENTS

| | | | |
|---|---|---|---|
| 8,136,709 B2 | 3/2012 | Jeli et al. | |
| 8,210,407 B2 | 7/2012 | Sautter et al. | |
| 8,245,893 B2 | 8/2012 | Sautter et al. | |
| 8,393,508 B2 * | 3/2013 | Sautter | B60R 9/055 224/321 |
| 8,444,033 B2 | 5/2013 | Brochier et al. | |
| 8,496,145 B2 | 7/2013 | Sautter et al. | |
| 8,556,146 B2 | 10/2013 | Sautter et al. | |
| 8,807,407 B2 | 8/2014 | Hubbard et al. | |
| 9,222,278 B2 | 12/2015 | Park | |
| 9,290,131 B2 | 3/2016 | Sautter et al. | |
| 9,381,866 B2 | 7/2016 | Sautter et al. | |
| 9,499,999 B2 | 11/2016 | Zhou | |
| 9,567,767 B2 * | 2/2017 | Kendrick | E04H 15/34 |
| 9,580,928 B1 | 2/2017 | Currid | |
| 9,896,034 B2 * | 2/2018 | Ward | B60R 9/045 |
| 10,125,517 B2 * | 11/2018 | Xu | E04H 15/06 |
| 2002/0125282 A1 | 9/2002 | Laverack et al. | |
| 2003/0071097 A1 | 4/2003 | Dean | |
| 2005/0011547 A1 | 1/2005 | Herndon et al. | |
| 2005/0077335 A1 | 4/2005 | Bourne | |
| 2005/0087220 A1 | 4/2005 | Christensen | |
| 2005/0145639 A1 | 7/2005 | Viklund et al. | |
| 2006/0000859 A1 | 1/2006 | Frischer | |
| 2006/0273122 A1 | 12/2006 | Bogoslofski et al. | |
| 2006/0273124 A1 | 12/2006 | Bogoslofski | |
| 2006/0289577 A1 | 12/2006 | Malone | |
| 2007/0119888 A1 | 5/2007 | Chuang | |
| 2007/0140808 A1 | 6/2007 | Peng | |
| 2007/0164065 A1 | 7/2007 | Davis | |
| 2008/0000940 A1 | 1/2008 | Wang | |
| 2008/0029563 A1 | 2/2008 | Malone | |
| 2008/0164292 A1 | 7/2008 | Farney | |
| 2008/0193265 A1 | 8/2008 | Sautter et al. | |
| 2008/0308138 A1 | 12/2008 | Brochier et al. | |
| 2009/0120982 A1 | 5/2009 | Sautter et al. | |
| 2010/0078454 A1 | 4/2010 | Sautter et al. | |
| 2010/0147914 A1 | 6/2010 | Sautter et al. | |
| 2010/0263698 A1 | 10/2010 | Chiu | |
| 2011/0132946 A1 | 6/2011 | Sautter et al. | |
| 2011/0139838 A1 | 6/2011 | Sautter et al. | |
| 2011/0139841 A1 | 6/2011 | Sautter et al. | |
| 2011/0139842 A1 | 6/2011 | Sautter et al. | |
| 2012/0234881 A1 | 9/2012 | Sautter et al. | |
| 2013/0175308 A1 | 7/2013 | Sautter et al. | |
| 2013/0186442 A1 | 7/2013 | Carlson | |
| 2013/0264366 A1 * | 10/2013 | Hubbard | B60R 9/055 224/328 |
| 2013/0292436 A1 * | 11/2013 | Hubbard | B60R 9/045 224/321 |
| 2014/0166710 A1 | 6/2014 | Sautter et al. | |
| 2015/0076197 A1 | 3/2015 | Sautter et al. | |
| 2015/0176300 A1 | 6/2015 | Caron | |
| 2017/0036613 A1 | 2/2017 | Sautter et al. | |

FOREIGN PATENT DOCUMENTS

| | | |
|---|---|---|
| AU | 2012100411 A4 | 5/2012 |
| AU | 2012101404 A4 | 10/2012 |
| CA | 1095808 A | 2/1981 |
| CA | 2045392 A1 | 12/1992 |
| CA | 2222397 A1 | 5/1999 |
| CA | 2527592 A1 | 4/2006 |
| CA | 2886590 A1 | 9/2015 |
| CH | 583007 A5 | 12/1976 |
| CN | 2102214 U | 4/1992 |
| CN | 2445963 Y | 9/2001 |
| CN | 2725439 Y | 9/2005 |
| CN | 2902805 Y | 5/2007 |
| CN | 201102462 Y | 8/2008 |
| CN | 201401043 Y | 2/2010 |
| CN | 201677818 U | 12/2010 |
| CN | 201915684 U | 8/2011 |
| CN | 102174866 A | 9/2011 |
| CN | 202144682 U | 2/2012 |
| CN | 202215047 U | 5/2012 |
| CN | 202273459 U | 6/2012 |
| CN | 202370286 U | 8/2012 |
| CN | 102926583 A | 2/2013 |
| CN | 202755717 U | 2/2013 |
| CN | 202767615 U | 3/2013 |
| CN | 103089060 A | 5/2013 |
| CN | 202990548 U | 6/2013 |
| CN | 203113891 U | 8/2013 |
| CN | 203172409 U | 9/2013 |
| CN | 203244152 U | 10/2013 |
| CN | 203296455 U | 11/2013 |
| CN | 103541584 A | 1/2014 |
| CN | 203441154 U | 2/2014 |
| CN | 103669984 A | 3/2014 |
| CN | 203475928 U | 3/2014 |
| CN | 203499326 U | 3/2014 |
| CN | 203514942 U | 4/2014 |
| CN | 203583988 U | 5/2014 |
| CN | 203583989 U | 5/2014 |
| CN | 203654859 U | 6/2014 |
| CN | 204098601 U | 1/2015 |
| CN | 104453344 A | 3/2015 |
| CN | 104477102 A | 4/2015 |
| CN | 104481196 A | 4/2015 |
| CN | 204236357 U | 4/2015 |
| CN | 204370893 U | 6/2015 |
| CN | 204492321 U | 7/2015 |
| CN | 105089331 A | 11/2015 |
| CN | 204754424 U | 11/2015 |
| CN | 204850673 U | 12/2015 |
| CN | 204899411 U | 12/2015 |
| CN | 204899422 U | 12/2015 |
| CN | 204983887 U | 1/2016 |
| CN | 205089041 U | 3/2016 |
| DE | 2405746 A1 | 8/1975 |
| DE | 2420344 A1 | 11/1975 |
| DE | 2635774 A1 | 2/1978 |
| DE | 2745969 A1 | 4/1979 |
| DE | 2751561 A1 | 5/1979 |
| DE | 2850062 A1 | 5/1980 |
| DE | 2940095 A1 | 4/1981 |
| DE | 3013766 A1 | 10/1981 |
| DE | 3332205 A1 | 3/1985 |
| DE | 3500463 A1 | 7/1986 |
| DE | 3538287 A1 | 4/1987 |
| DE | 3702953 A1 | 8/1988 |
| DE | 3912692 A1 | 11/1989 |
| DE | 4008851 A1 | 9/1991 |
| DE | 4229268 A1 | 3/1994 |
| DE | 4239350 A1 | 5/1994 |
| DE | 29603867 U1 | 11/1996 |
| DE | 29705305 U1 | 10/1997 |
| DE | 19626973 A1 | 1/1998 |
| DE | 19900186 A1 | 7/2000 |
| DE | 20216105 U1 | 2/2003 |
| DE | 20309766 U1 | 10/2003 |
| DE | 10219392 A1 | 11/2003 |
| DE | 202006012653 U1 | 1/2007 |
| DE | 202009007989 U1 | 10/2009 |
| DE | 202009016908 U1 | 4/2010 |
| DE | 202011109435 U1 | 3/2012 |
| DE | 202012010827 U1 | 1/2013 |
| DE | 202014004043 U1 | 11/2014 |
| DE | 102013015762 B3 | 12/2014 |
| DE | 202014007021 U1 | 4/2015 |
| EP | 0019873 B1 | 10/1982 |
| EP | 0482650 A1 | 4/1992 |
| EP | 0511179 A1 | 10/1992 |
| EP | 0894672 A1 | 2/1999 |
| EP | 1442940 A1 | 8/2004 |
| EP | 2169147 A1 | 3/2010 |
| EP | 2443006 B1 | 8/2014 |
| FR | 1400231 A | 4/1965 |
| FR | 2241273 A1 | 3/1975 |
| FR | 2241274 A1 | 3/1975 |
| FR | 2319516 A1 | 2/1977 |
| FR | 2340069 A1 | 9/1977 |

(56) References Cited

FOREIGN PATENT DOCUMENTS

| | | |
|---|---|---|
| FR | 2370406 A1 | 6/1978 |
| FR | 2415560 A1 | 8/1979 |
| FR | 2457788 A1 | 12/1980 |
| FR | 2462300 A2 | 2/1981 |
| FR | 2466369 A2 | 4/1981 |
| FR | 2481209 A1 | 10/1981 |
| FR | 2486376 A1 | 1/1982 |
| FR | 2501601 A1 | 9/1982 |
| FR | 2519305 A1 | 7/1983 |
| FR | 2525539 A1 | 10/1983 |
| FR | 2563713 A1 | 11/1985 |
| FR | 2583812 A1 | 12/1986 |
| FR | 2600953 A1 | 1/1988 |
| FR | 2617775 A1 | 1/1989 |
| FR | 2624808 A2 | 6/1989 |
| FR | 2633497 A1 | 1/1990 |
| FR | 2695158 A1 | 3/1994 |
| FR | 2783007 A1 | 3/2000 |
| FR | 2800409 A1 | 5/2001 |
| FR | 2800410 A1 | 5/2001 |
| FR | 2853869 A1 | 10/2004 |
| GB | 14666 A | 4/1915 |
| GB | 304998 A | 1/1929 |
| GB | 432367 A | 7/1935 |
| GB | 555652 A | 9/1943 |
| GB | 723591 A | 2/1955 |
| GB | 735367 A | 8/1955 |
| GB | 767904 A | 2/1957 |
| GB | 864290 A | 3/1961 |
| GB | 886743 A | 1/1962 |
| GB | 921675 A | 3/1963 |
| GB | 926222 A | 5/1963 |
| GB | 955850 A | 4/1964 |
| GB | 971346 A | 9/1964 |
| GB | 989081 A | 4/1965 |
| GB | 1030198 A | 5/1966 |
| GB | 1220683 A | 1/1971 |
| GB | 1279318 A | 6/1972 |
| GB | 1334701 A | 10/1973 |
| GB | 1391685 A | 4/1975 |
| GB | 2011843 A | 11/1977 |
| GB | 1502473 A | 3/1978 |
| GB | 2040834 A | 9/1980 |
| GB | 2097031 A | 10/1982 |
| GB | 2107259 A | 4/1983 |
| GB | 2231068 A | 11/1990 |
| GB | 2257463 A | 1/1993 |
| GB | 2322879 A | 9/1998 |
| GB | 2342931 A | 4/2000 |
| GB | 2362170 A | 11/2001 |
| GB | 2376000 A | 12/2002 |
| GB | 2383351 A | 6/2003 |
| GB | 2390070 A | 12/2003 |
| GB | 2447277 A | 9/2008 |
| GB | 2502073 A | 11/2013 |
| JP | 6331851 A | 2/1988 |
| JP | 2-261173 A | 10/1990 |
| JP | 4-1376 A | 1/1992 |
| JP | 5-98851 A | 4/1993 |
| JP | 5-202641 A | 8/1993 |
| JP | 6-16647 A | 3/1994 |
| JP | 6-35543 U | 5/1994 |
| JP | 6-83870 U | 12/1994 |
| JP | 3007485 U | 2/1995 |
| JP | 3012800 U | 6/1995 |
| JP | 7-279486 A | 10/1995 |
| JP | 7-44188 U | 11/1995 |
| JP | 8-42194 A | 2/1996 |
| JP | 8-86123 A | 4/1996 |
| JP | 8-135255 A | 5/1996 |
| JP | 8-151825 A | 6/1996 |
| JP | 8-318780 A | 12/1996 |
| JP | 9-72130 A | 3/1997 |
| JP | 9-164872 A | 6/1997 |
| JP | 9-309377 A | 12/1997 |
| JP | 10-115128 A | 5/1998 |
| JP | 10-220074 A | 8/1998 |
| JP | 10-292676 A | 11/1998 |
| JP | 11-165539 A | 6/1999 |
| JP | 2000-27493 A | 1/2000 |
| JP | 3070456 U | 8/2000 |
| JP | 2000318538 A | 11/2000 |
| JP | 2002-161652 A | 6/2002 |
| JP | 2002-201822 A | 7/2002 |
| JP | 2002-309804 A | 10/2002 |
| JP | 2004-324391 A | 11/2004 |
| JP | 2008-94287 A | 4/2008 |
| JP | 2010-248788 A | 11/2010 |
| JP | 3171184 U | 9/2011 |
| JP | 2012-7347 A | 1/2015 |
| KR | 91-1170 Y1 | 2/1991 |
| KR | 0119095 Y1 | 3/1998 |
| KR | 20-0223673 Y1 | 3/2001 |
| KR | 20-0322913 Y1 | 7/2003 |
| KR | 20-0328451 Y1 | 9/2003 |
| KR | 20-0352877 Y1 | 6/2004 |
| KR | 10-2004-0100403 A | 12/2004 |
| KR | 10-2005-0009972 A | 1/2005 |
| KR | 20-0373213 Y1 | 1/2005 |
| KR | 20-0383803 Y1 | 5/2005 |
| KR | 10-2005-0058607 A | 6/2005 |
| KR | 10-1237387 B1 | 2/2013 |
| KR | 10-1241369 B1 | 3/2013 |
| KR | 20-2013-0004459 U | 7/2013 |
| KR | 10-2013-0097136 A | 9/2013 |
| KR | 10-2013-0112013 A | 10/2013 |
| KR | 10-1318392 B1 | 10/2013 |
| KR | 10-1355379 B1 | 1/2014 |
| KR | 10-2014-0013626 A | 2/2014 |
| KR | 10-1367938 B1 | 2/2014 |
| KR | 10-1367939 B1 | 2/2014 |
| KR | 10-1376300 B1 | 3/2014 |
| KR | 10-2014-0045697 A | 4/2014 |
| KR | 10-1384696 B1 | 4/2014 |
| KR | 10-1398800 B1 | 5/2014 |
| KR | 10-1424104 B1 | 7/2014 |
| KR | 10-1446004 B1 | 9/2014 |
| KR | 20-0474777 Y1 | 10/2014 |
| KR | 10-2014-0137468 A | 12/2014 |
| KR | 10-2015-0022375 A | 3/2015 |
| KR | 10-1510392 B1 | 4/2015 |
| KR | 10-1516916 B1 | 4/2015 |
| KR | 10-2015-0075801 A | 7/2015 |
| KR | 10-2015-0092023 A | 8/2015 |
| KR | 10-2015-0142480 A | 12/2015 |
| KR | 10-2016-0001718 A | 1/2016 |
| KR | 101585911 B1 | 1/2016 |
| NL | 7500093 A | 7/1976 |
| NL | 7710832 A | 4/1979 |
| NL | 8104637 A | 5/1983 |
| RU | 2395657 C1 | 7/2010 |
| SE | 457100 B | 11/1988 |
| SE | 9804343 L | 6/2000 |
| TW | M265267 U | 5/2005 |
| WO | 9624509 A1 | 8/1996 |
| WO | 9723365 A1 | 7/1997 |
| WO | 9810959 A1 | 3/1998 |
| WO | 0196693 A1 | 12/2001 |
| WO | 0306005 A1 | 5/2003 |
| WO | 2005005184 A2 | 1/2005 |
| WO | 2005021332 A1 | 3/2005 |
| WO | 2008141364 A1 | 11/2008 |
| WO | 2009158360 A1 | 12/2009 |
| WO | 2010141944 A1 | 12/2010 |
| WO | 2010144369 A1 | 12/2010 |
| WO | 2010148011 A1 | 12/2010 |

OTHER PUBLICATIONS

ORS Racks Direct.Com, "Yakima FrontLoader Bike Rack Review Video by ORS Racks Direct", May 19, 2010, Retrieved from the Internet on Oct. 11, 2012, URL:http://www.youtube.com/watch?v=cu8rHM9ORdw, 9 pages.

(56) References Cited

OTHER PUBLICATIONS

Rack Attack Portland's Blog, "Another hit from Yakima! The all new factory-compatible FrontLoader uprightbike rack", Mar. 29, 2010, Retrieved from the Internet on Oct. 11, 2012, URL:http://rackattackportland.wordpress.com/2010103/29/anotherhit-from-yakima-the-all-new-factory-compatible-frontloader-upright-bike-rack/, 3 pages.

Yakima FrontLoader upright bike rack review, Apr. 17, 2010, Retrieved from the Internet http://carracks.blogspot.n1/2010/04/yakima-frontloader-upright-bike-rack.html, 2 pages.

Heinlen, Jerry, "Yakima FrontLoader Recall Information", Retrieved from the Internet on Oct. 11, 2012, URL: http://firecall.yakima.com, 2 pages.

Yakima, "Frontloader", Oct. 11, 2012, Retrieved from the Internet on Oct. 11, 2012, URL:http://yakima.com/shop/bike/roof/frontloader#pr-header-8002103, 5 pages.

The International Bureau of WIPO, International Preliminary Report on Patentability regarding PCT Patent Application No. PCT/US2017/036000, dated Dec. 20, 2018, 10 pages.

* cited by examiner

VEHICLE ROOFTOP RACK ASSEMBLY

CROSS-REFERENCES TO RELATED APPLICATIONS

This application claims priority under 35 U.S.C. § 119(e) from U.S. Provisional Patent Application Ser. No. 62/345,835 filed Jun. 5, 2016, which is incorporated herein by reference. Also incorporated herein by reference in its entirety is U.S. Pat. No. 9,381,866 B2.

INTRODUCTION

Popularity of outdoor recreational activities has created increased demand for different ways to carry a variety of recreational equipment on vehicles. For example, rooftop tents are mounted and used on top of a vehicle, for easy setup and transportation. The tent is typically mounted in a compact form for travel, then set up for use at a destination with at least a portion of the vehicle rooftop supporting the tent floor. A ladder allows access to the tent, and provides additional support.

Rooftop tents typically use bolts and bail with many loose parts to attach the tent to a pair of crossbars on the roof of the vehicle. These attachment mechanisms can be difficult and time consuming to implement, making an improved, simpler, more robust mounting system desirable.

DETAILED DESCRIPTION

This disclosure provides numerous selected examples of invented devices for mounting a tent, platform, or awning to the roof of a vehicle. Many alternatives and modifications which may or may not be expressly mentioned, are enabled, implied, currently possessed, and are supported by the disclosure.

Figure 1:
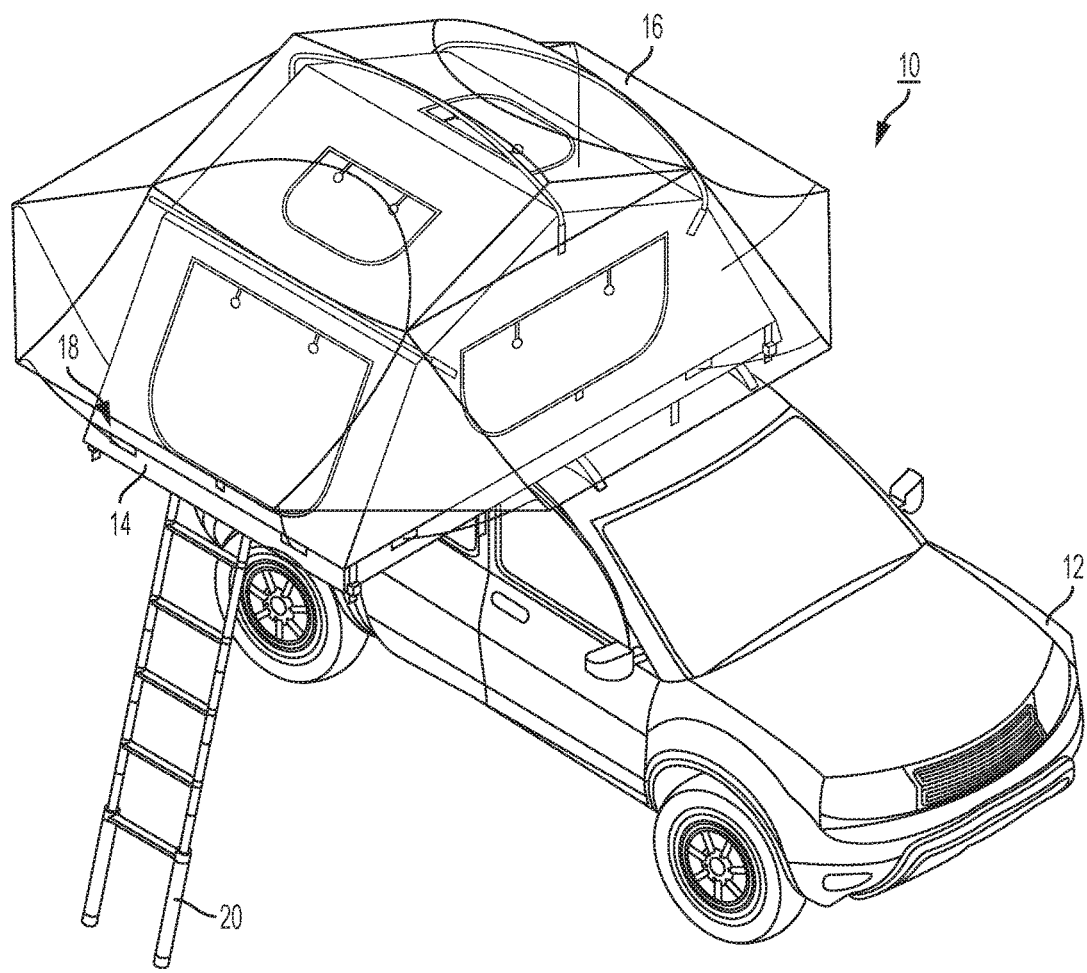
FIG. 1 is an isometric view of a rooftop tent assembly according to aspects of the present disclosure.

FIG. 1 shows a rooftop rack assembly generally indicated at 10, mounted 3i5 on a stationary vehicle 12. The rack assembly includes a platform 14 supporting a tent 16 on a top side 18, and a telescoping ladder 20 mounted on the platform for support and access to the tent. Tent 16 is shown in a use configuration, with platform 14 unfolded and supported by both the roof of vehicle 12 and ladder 20. In some examples, a rooftop rack assembly may include a cargo box, or other equipment mounted on a platform.

Figure 2:
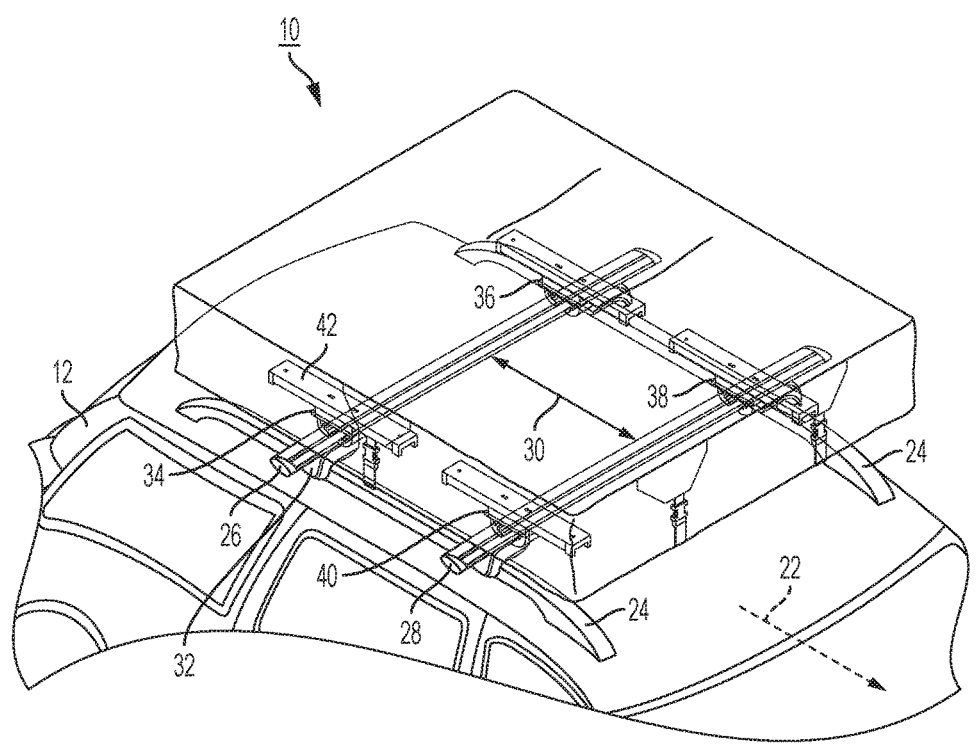
FIG. 2 is a partially transparent isometric view of the rooftop tent assembly of FIG. 1, in a storage mode, configured for vehicle travel.

To transport the pictured example of assembly 10, ladder 20 may be telescoped and folded up, tent 16 may be collapsed, and platform 14 may be folded. A storage (for transport) configuration of assembly 10 is shown in FIG. 2. Tent 16 may be configured to collapse as platform 14 is folded, to facilitate easy stowing of assembly 10. The assembly may include a cover and straps or buckles to hold the cover in place, in order to protect assembly 10 during transportation.

FIG. 2 shows vehicle 12 with a direction of travel 22. Two raised rails 24 extending parallel to the direction of travel are fixed to the rooftop, and a pair of crossbars 26, 28 are coupled to the raised rails. Crossbars 26, 28 are perpendicular to the direction of travel with a spacing 30 between them. Each crossbar is supported by a pair of couplers 32 as part of a crossbar assembly, with one coupler on each raised rail 24. In other examples, crossbars 26, 28 may be coupled directly to the vehicle rooftop by tower-style couplers, or by any suitable couplers. The crossbars, couplers, and rails may be of sufficient structural strength to support rack assembly 10, and may have a load carrying capacity of at least 165 lbs.

Rack assembly 10 is coupled to crossbars 26, 28 by four clamps 34, 36, 38, 40. Each clamp is slidably mounted in a rail 42, which is fixed to platform 14. Rails 42 are fixed parallel to the direction of travel, and perpendicular to crossbars 26, 28. Rails 42 are disposed on platform 14 such that each clamp may be aligned with a crossbar. The clamps are configured to grip a crossbar, and each crossbar is gripped by two clamps. Clamps 34, 36 grip crossbar 26 and clamps 38, 40 grip crossbar 28.

Rails 42 are laterally spaced on platform 14 such that each clamp grips a crossbar inboard of raised rails 24 and couplers 32. In some examples, rails 42 may be laterally spaced such that each clamp grips a crossbar outboard of raised rails 24. In such examples, the clamp may grip the crossbar no more than 1 inch from a coupler 32. In other examples, rack assembly 10 may include only two rails with two clamps mounted on each rail. In such examples, each rail may extend over two crossbars so that both mounted clamps may be aligned with a crossbar.

Figure 3:
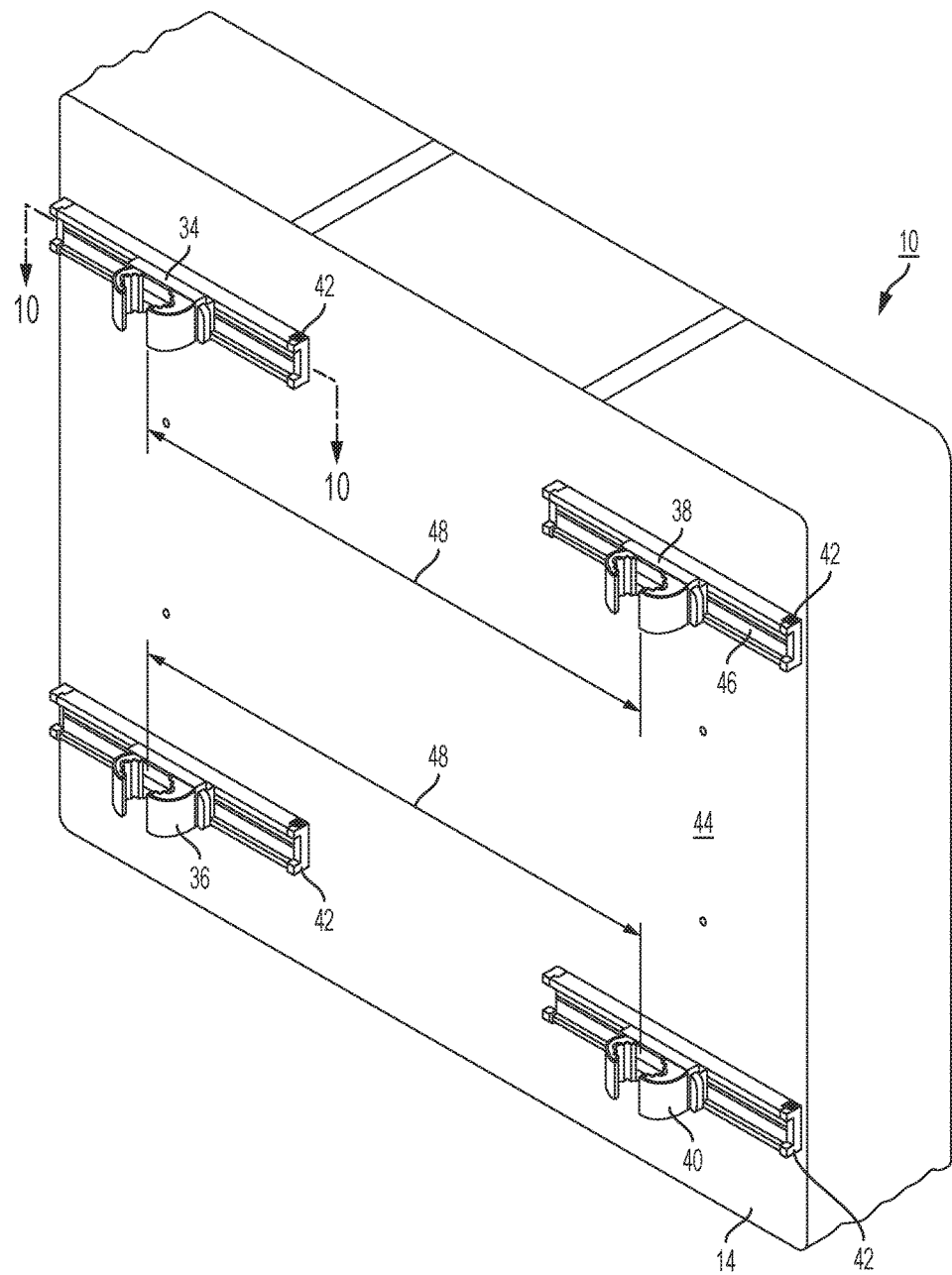
FIG. 3 is an isometric view of the bottom face of the rooftop tent assembly of FIG. 2.

FIG. 3 shows a bottom side 44 of platform 14, including rails 42 and clamps 34, 36, 38, 40. Rails 42 are bolted to platform 14 through corresponding apertures in the rails and the platform. In some examples, platform 14 may include a plurality of apertures such that the rails may be screwed to the platform in a plurality of discrete positions. Any positions appropriate to support rack assembly 10 may be included. Rails 42 may also be attached to platform 14 by any appropriate means, such as adhesive, screw, or other fasteners.

Before installing rack assembly 10 on vehicle 12, a user may set the clamps to align with crossbars 26, 28. Each clamp is mounted in a linear track 46 of a rail 42, and slides freely along the track. Once a clamp has been slid to a selected location along rail 42, the clamp may be fixed in place relative to the rail.

In FIG. 3, clamps 34 and 38 are set with a longitudinal spacing of 48, and clamp 36 is set to an equal spacing from clamp 40. Longitudinal clamp spacing 48 may match crossbar spacing 30. Clamp 34 is also aligned with clamp 36, and clamp 38 aligned with clamp 40. A user may also adjust all four clamps in other configurations to fit the geometry of a particular vehicle or pair of crossbars.

Figure 4:
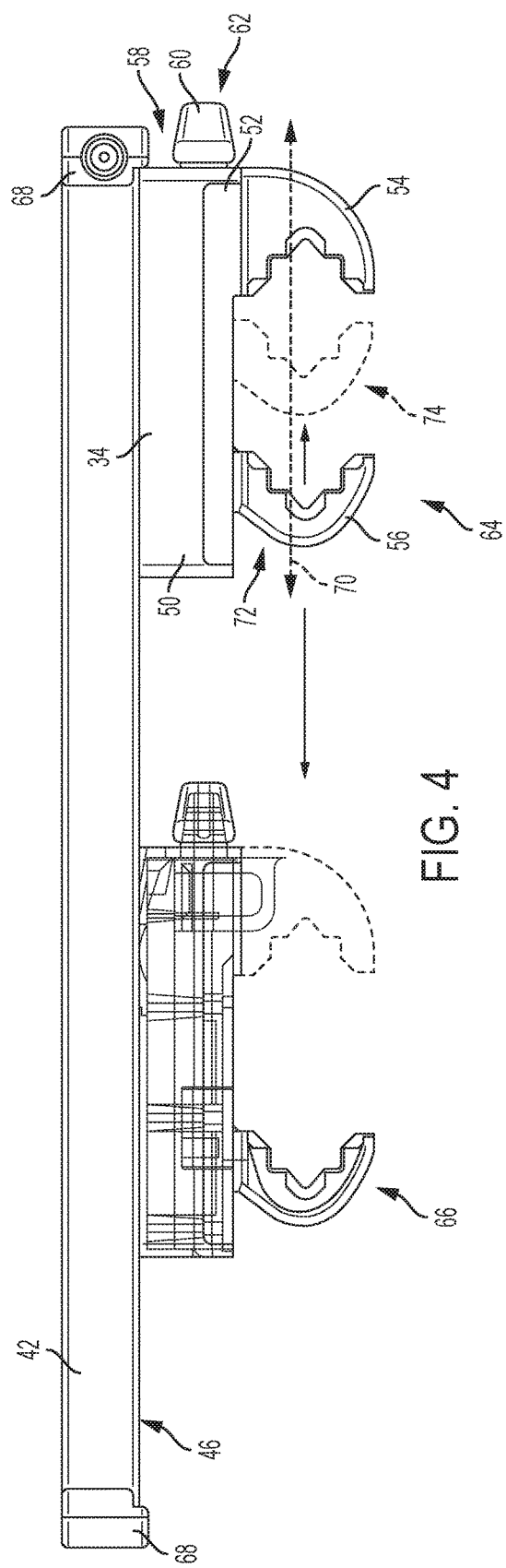
FIG. 4 is a side view of a rail of the rooftop tent assembly of FIG. 3, illustrating motion of a clamp.

FIG. 4 is a side view of clamp 34 and rail 42, illustrating movements of clamp 34 relative to the rail. It should be appreciated that clamps 34, 36, 38, 40 are matching, and therefore FIGS. 4-10 may further illustrate any of the four clamps. Clamp 34 includes an upper body 50 that engages rail 42, and a lower body 52 with a first jaw 54 and a second jaw 56. An actuator 58 extends through the clamp 34, with a handle 60 at an end 62 of the clamp.

Clamp 34 moves in two independent ways. The clamp slides along rail 42, for example from position 64 to position 66. The clamp slides freely and may be adjusted by hand to a selected location, anywhere along the extent of rail 42. The rail includes two end caps 68 at a first and second end of the rail. End caps 68 limit the range of clamp 34, preventing the clamp from sliding past the first or second end of rail 42. End caps 68 also thereby retains clamp 34 in linear track 46.

Also, second jaw 56 moves toward or away from first jaw 54, along an axis 70 parallel to rail 42 and direction of travel 22. For example, second jaw 56 may be moved from position 72 to position 74. Motion of jaw 56 is controlled by actuator 58. By turning handle 60 in a clockwise or counterclockwise direction, a user may pull second jaw 56 toward first jaw 54 or push it away. That is, actuator 58 is configured to adjust the spacing between first jaw 54 and second jaw 56. This motion serves to open or close clamp 34. Jaw 56 may be moved to position 72 in order to insert a crossbar between jaws 54, 56, then jaw 56 may be moved to position 74 in order to grip the crossbar.

Figure 5:
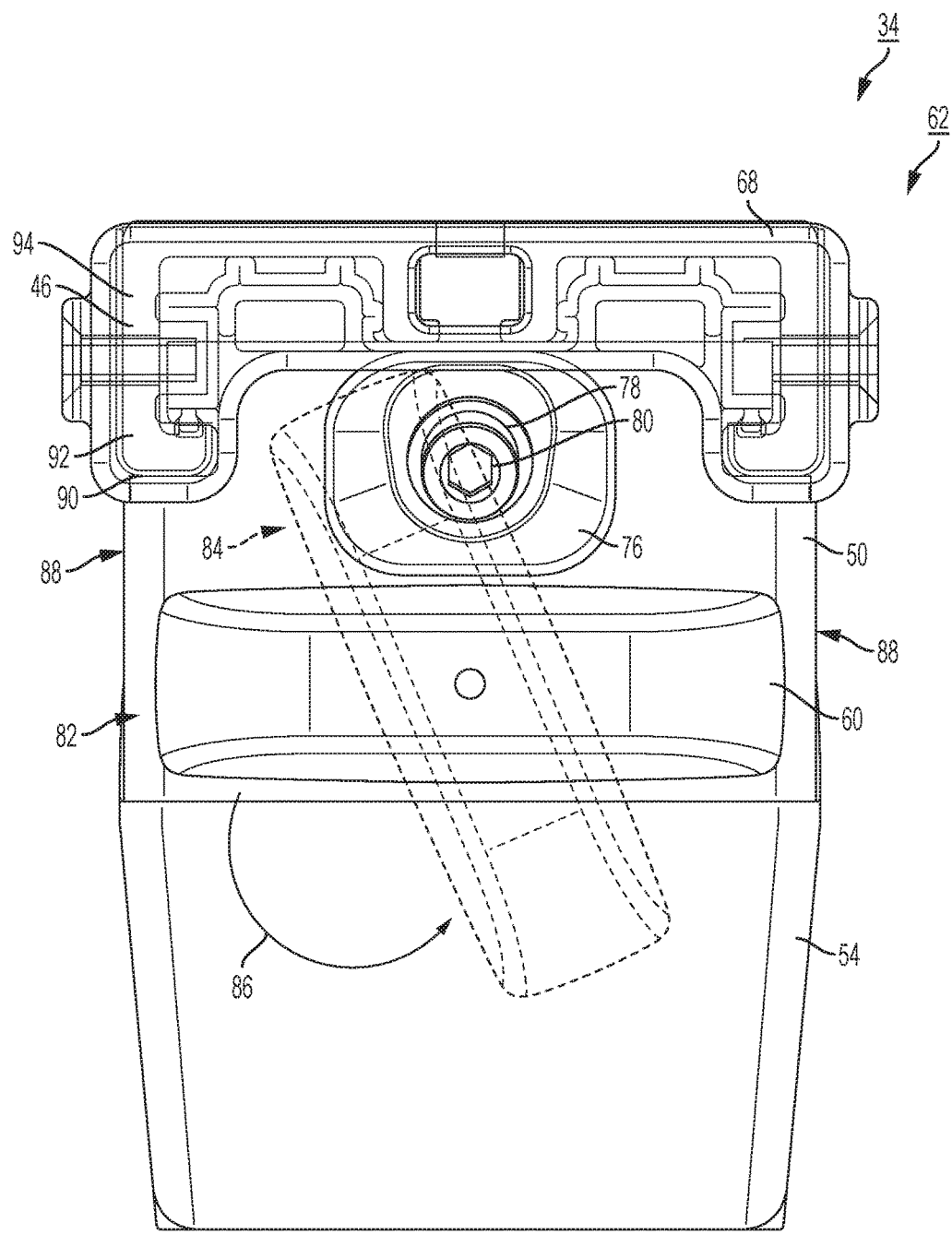
FIG. 5 is an end view of the rail and clamp of FIG. 4

FIG. 5 shows end 62 of clamp 34, with the clamp in position 64 as shown in FIG. 4. Upper body 50 includes a recess 76 with an aperture 78 configured to receive a fix bolt 80. The fix bolt has a threaded shaft that actuates a fixation device of clamp 34, which is configured to fix the clamp in a selected location along rail 42. Fix bolt 80 includes a tooling recess to be used with a hex-wrench. In other examples, the bolt may include a tooling recess configured to be used with any appropriate tool such as a Phillips-head screw driver, Torx wrench, or socket wrench.

Returning briefly to FIGS. 2-3, to install rack assembly 10 on vehicle 12, a user may measure crossbar spacing 30, and set clamps 34, 36, 38, 40 accordingly. Once the clamps are set to a generally correct configuration, a user may lightly tighten fix bolt 80 of each clamp to secure the configuration. Then, after placing rack assembly 10 on vehicle 12 as shown in FIG. 2, a user may loosen fix bolts 80 to perform additional adjustments. Once assembly 10 is correctly seated, the user may tighten fix bolts 80 to secure the assembly for transportation. Fix bolt 80 may be tightened to 2.75 Newton meters, plus or minus 0.25 Newton meters, or any torque sufficient to secure rack assembly 10 to vehicle 12 through standard acceleration and impact events.

FIG. 5 also illustrates use of handle 60 to actuate clamp 34. For example, Handle 60 may be rotated from a first position 82 to a second position 84 counterclockwise as indicated by arrow 86, to open clamp 34. Handle 60 may also be rotated clockwise to close clamp 34. Actuator 58 may configured such that a comfortable number of revolutions is required to close clamp 34 on a crossbar from a fully open position. In some examples the actuator may also convey a mechanical advantage to allow a user to sufficiently tighten clamp 34 without a significant application of force.

In FIG. 5, fix bolt 80 is disposed above handle 60. The head of the bolt is entirely received in recess 76 so that handle 60 may be turned past recess 76 without interference from fix bolt 80. Handle 60 is also of a length appropriate to allow the handle to be turned without interference from end-cap 68.

Upper body 50 has two sides 88 that each include a lateral recess 90 that engages linear track 46 of rail 42. End cap 68 is shown as transparent, revealing a lip 92 on each of two side walls 94 of track 46. Track lips 92 extend inward and are received in lateral recesses 90 of clamp 34, coupling the clamp to rail 42. In some examples, recesses 90 may open into an inner surface of clamp 34 and track lips 92 may extend outward from rail 42. The complementary components may be square, round, or of any appropriate geometry. Clamp 34 may also be coupled to rail 42 by any means configured to allow sliding with minimal frictional resistance.

Figure 6:
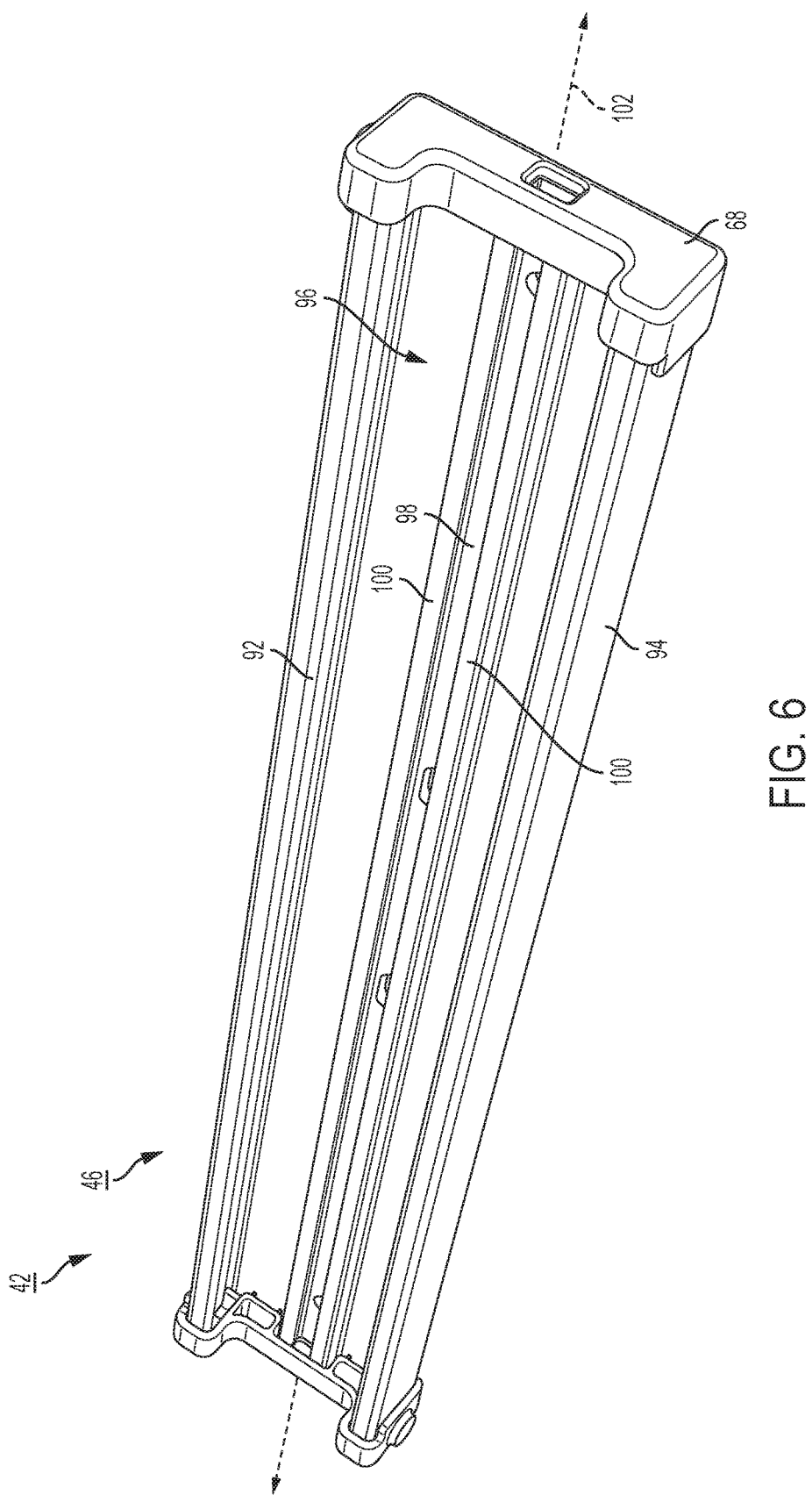
FIG. 6 is a perspective view of the track of the rail of FIG. 4.

FIG. 6 shows linear track 46 of rail 42 more clearly. An inner surface 96 of the track includes a central channel 98 formed between two berms 100. The apertures for bolting rail 42 to platform 14 are disposed in central channel 98. Berms 100 run the length of track 46, parallel to side walls 94 therefore to lips 92. Linear track 46 has a direction 102, defined by the parallel berms and the side walls.

Figure 7:
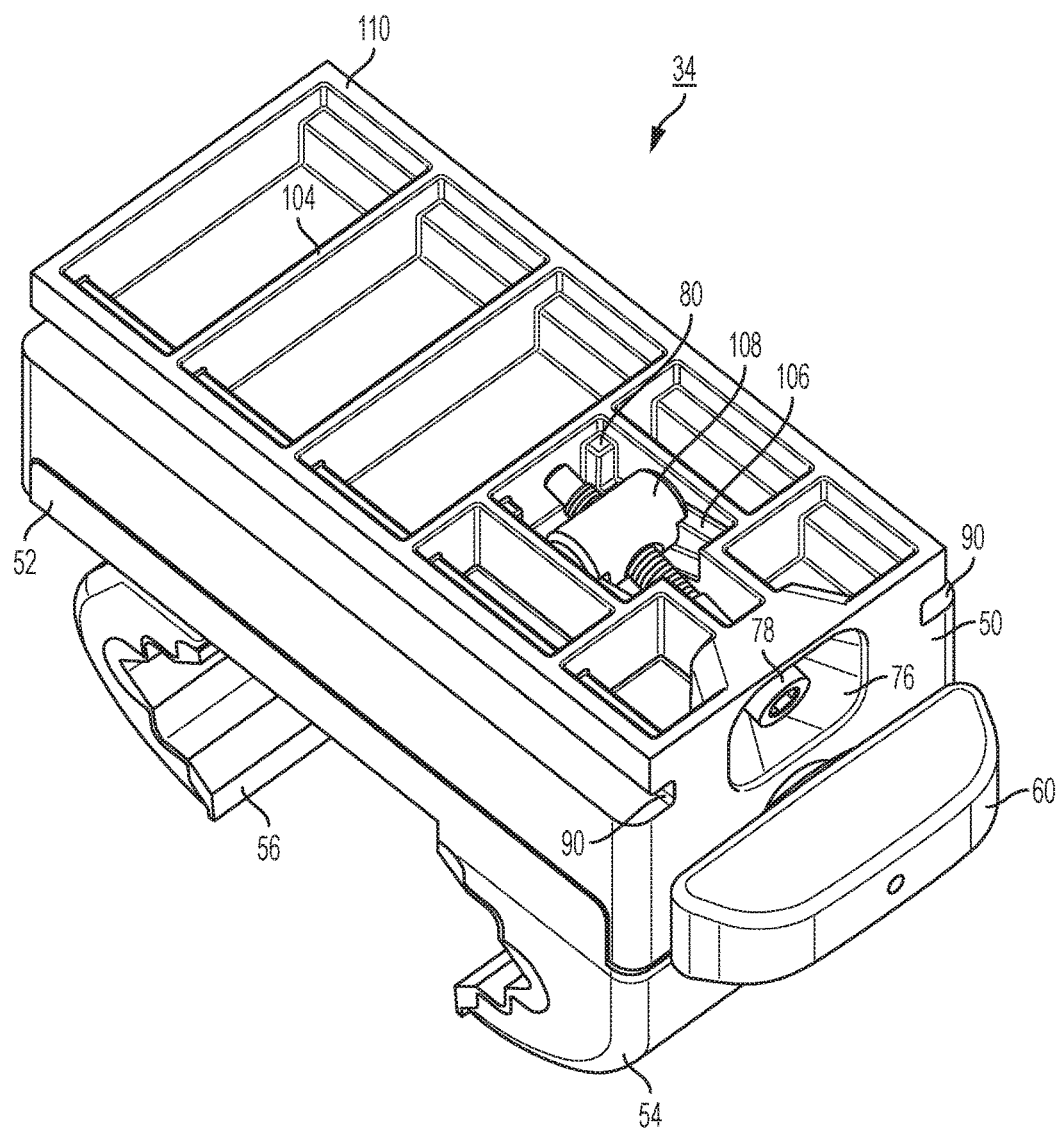
FIG. 7 is an isometric view of the clamp of FIG. 4.

FIG. 7 is a perspective view of clamp 34, without rail 42. Upper body 50 is predominantly hollow, with a plurality of stiffeners 104 providing structural strength. In other examples, upper body 50 may be entirely hollow, may be solid, or may be composed of multiple materials. As shown in FIG. 7, a central cavity 106 houses a barrel nut 108 and a portion of fix bolt 80. Together, fix bolt 80, barrel nut 108, and central cavity 106 form the fixation device for clamp 34.

Central cavity 106 is generally rectangular in shape, with an extension connecting to aperture 78. The cavity is of sufficient length for the partially threaded shaft of fix bolt 80 to extend from aperture 78 to an opposite end of the cavity. Central cavity 106 is also sufficiently wide to accommodate barrel nut 108. In other examples, the central cavity may have a circular shape or any other shape that accommodates barrel nut 108 and bolt 80.

Upper body 50 has a top surface 110, which is retained in track 46 when clamp 34 is mounted in the track. Referring also to FIG. 6, top surface 110 may be close enough to lateral recesses 90 that the top surface does not contact internal surface 96 of track 46 when clamp 34 is mounted in the track. That is, side walls 94 may be of sufficient height that top surface 110 does not contact berms 100 when clamp 34 is mounted in track 46. This may limit frictional contact between the clamp and the track, allowing the clamp to slide freely.

Figure 8:
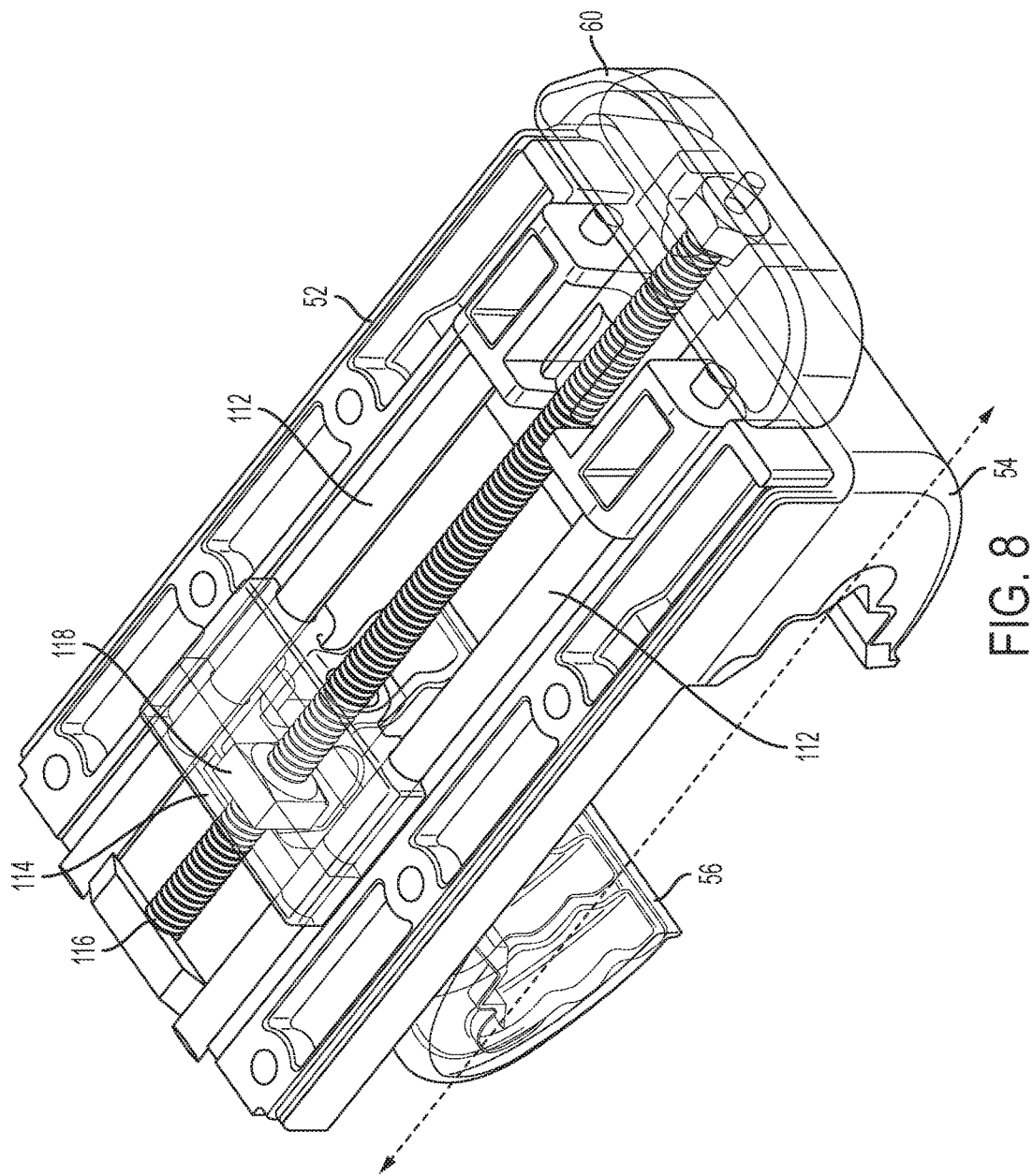
FIG. 8 is a partially transparent isometric view of a top portion of the clamp of FIG. 4.

FIG. 8 shows a lower portion of clamp 34, with second jaw 56 and handle 60 shown as transparent. Lower body 52 includes 6 screw channels for screwing lower body 52 to upper body 50, and two guides 112. First jaw 54 is formed as part of lower body 52. Second jaw 56 includes a connector portion 114 with three apertures and a rectangular recess. Guides 112 and an actuator bolt 116 extend through the apertures of connector portion 114, mounting second jaw 56 on lower body 52. A square nut 118 is disposed in the recess of connector portion 114, threaded onto actuator bolt 116.

The head of actuator bolt 116 is received in handle 60, with a hex shape configured to resist rotation. Therefore, when handle 60 is rotated, actuator bolt 116 is also rotated. Rotation of the bolt exerts a force on square nut 118, which in turn urges connector portion 114 along guides 112. Second jaw 56 is thereby moved along axis 70 when handle 60 is rotated.

Figure 9:
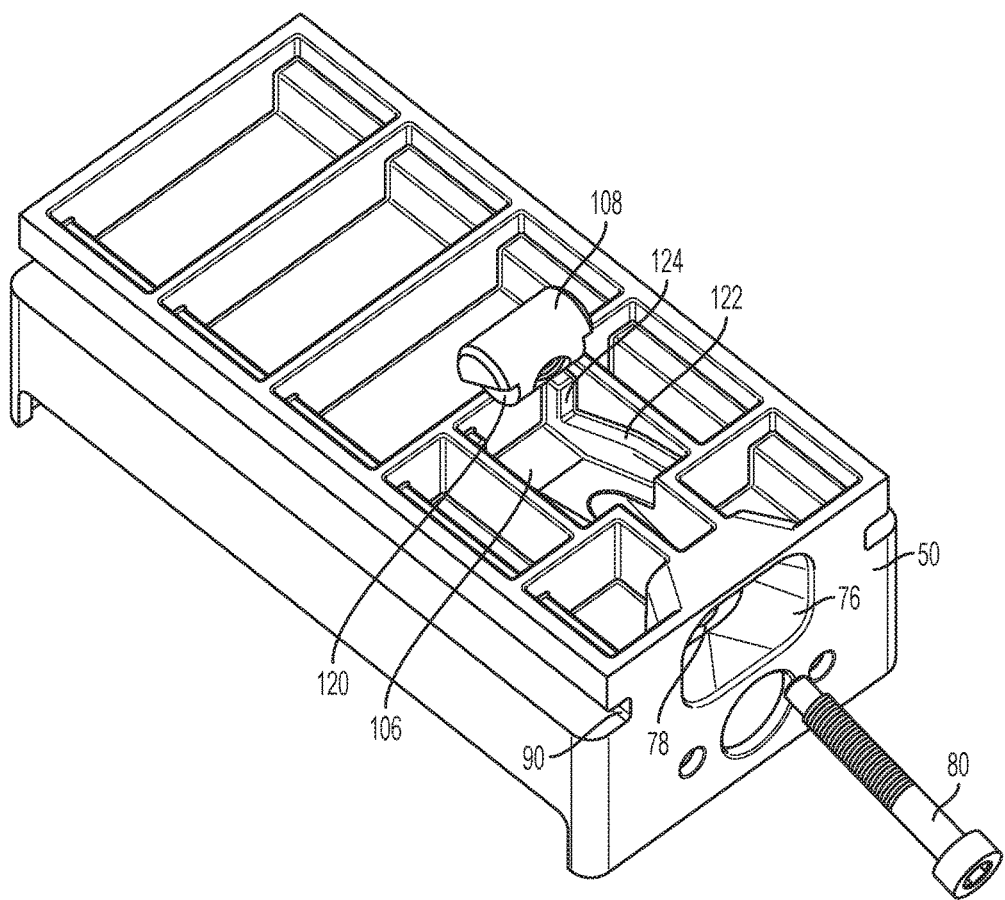
FIG. 9 is a partially exploded perspective view of an upper portion of the clamp of FIG. 4.

FIG. 9 shows an upper portion of clamp 34, exploded to allow barrel nut 108 and central cavity 106 to be seen more clearly. Barrel nut 108 is generally cylindrical in shape, but has two shoulders 120 with flat lower surfaces. On each of two sides, central cavity 106 has a ramp 122 corresponding to shoulders 120. When assembled as shown in FIG. 7, shoulders 120 of barrel nut 108 rest on ramps 122. As shown in FIG. 9, ramps 122 curve downward away from end 62 of clamp 34 and aperture 78. At a lowest end of each ramp is a column 124, configured to serve as a stop for barrel nut 108.

Figure 10:
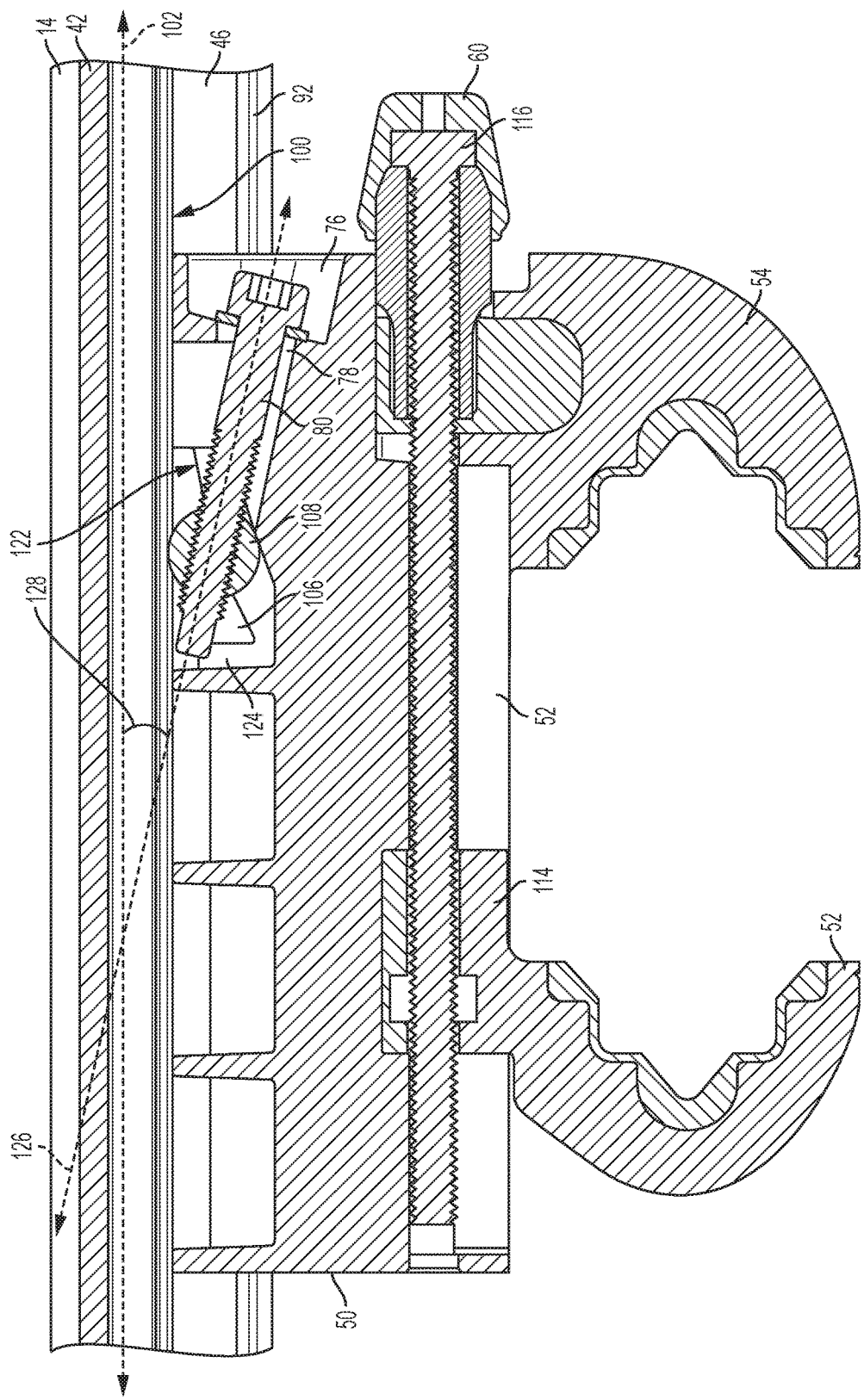
FIG. 10 is a partial cross sectional view of a clamp and a rail of FIG. 3, taken along lines 10-10.

FIG. 10 is a cross section of clamp 34 mounted in track 46 of rail 42 on platform 14, taken along lines 10-10 in FIG. 3. Fix bolt 80 can be seen to extend from recess 76, through a washer, aperture 78, the extension of central cavity 106, barrel nut 108, and short of the end of central cavity 106. Fix bolt 80 defines an axis of rotation 126, and is disposed such that the axis of rotation forms an angle 128 with direction 102 of track 46.

As fix bolt 80 is rotated, barrel nut 108 is drawn along the bolt and along ramps 122. When fix bolt 80 is rotated clockwise, barrel nut 108 is drawn up ramps 122 toward aperture 78. As the barrel nut moves along the ramps, the slope of the ramps changes, engaging with shoulder 120 to rotate the barrel nut. This rotation pivots fix bolt 80 about barrel nut 108, bringing the end of the bolt up and sending the head of the bolt down. Aperture 78 and the extension of central cavity 106 are configured to allow fix bolt 80 to pivot through a range of angles 128. For example, aperture 78 may be elongated on a vertical axis.

As barrel nut 108 is drawn up ramps 122, a top edge of the nut comes into contact with berms 100 of internal surface 96 of track 46, shown in FIG. 6. Any portion of fix bolt 80 higher than barrel nut 108 is received by central channel 98. Contact between barrel nut 108 and track 46 urges clamp 34 downward relative to the track and presses track lips 92 against an upper inner surface of lateral recesses 90. When barrel nut 108 is sufficiently high enough, frictional forces between the barrel nut and berms 100, and between track lips 92 and lateral recesses 90, fix clamp 34 relative to track 46. That is, when fix bolt 80 is tightened sufficiently, movement of clamp 34 is stopped in the selected position.

In the example pictured in FIG. 6, berms 100 have a flat top surface. In other examples, berms 100 may include multiple recesses spaced along track 46 and configured to partially or fully receive barrel nut 108. In such examples, the recesses may engage barrel nut 108 to prevent movement of clamp 34 relative to track 46. Track 46 may also have any internal surface 96, or structure formed on the surface, configured to engage barrel nut 108.

Referring again to FIG. 9, when fix bolt 80 is rotated counter clockwise, barrel nut 108 is urged down ramps 122 toward columns 124. Barrel nut 108 becomes entirely received in central cavity 106, and does not contact track 46. Clamp 34 is then free to slide along track 46. When barrel nut 108 contacts columns 124, fix bolt 80 is still threaded in barrel nut 108, but the bolt can no longer be rotated. Columns 124 thereby prevent fix bolt 80 being unscrewed from barrel nut 108.

Figure 11:
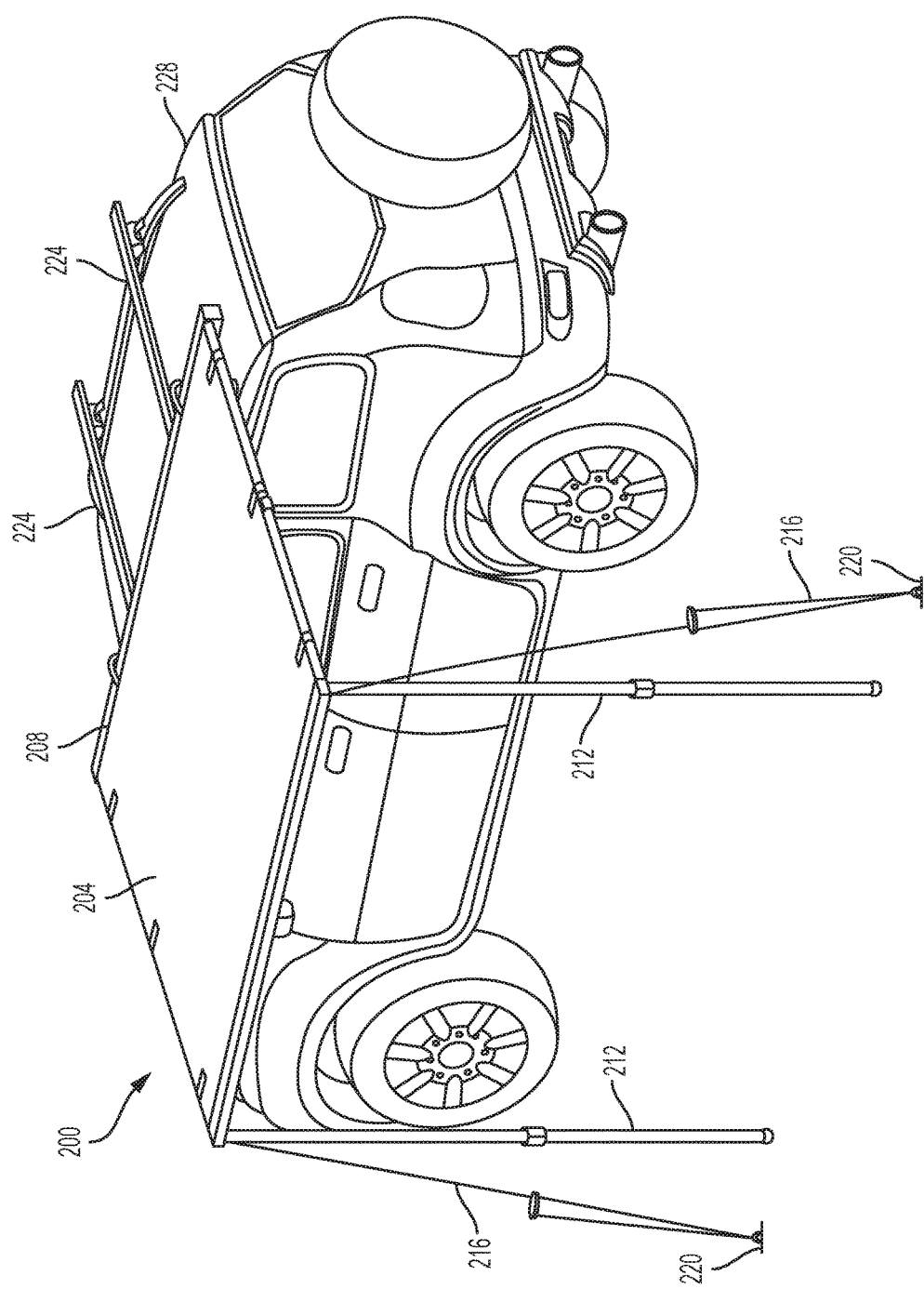
FIG. 11 is a perspective view of an awning system for providing shelter next to a vehicle.

FIG. 11 shows awning system 200 for providing shelter next to a vehicle. Awning system 200 includes flexible cover 204 which may be extended out from case 208. Legs 212 support distal side of cover 204 above the ground. Legs 212 may be provided with a telescoping mechanism which may be used to accommodate vehicles of different height, and also to provide a slant to cover 204, for example, for shade or draining purposes. Cords 216 and stakes 220 may be used to secure the positions of legs 212. Case 208 is equipped with clamps, as shown in FIG. 12, for connecting case 208 to crossbars 224 mounted on top of vehicle 228.

Figure 12:
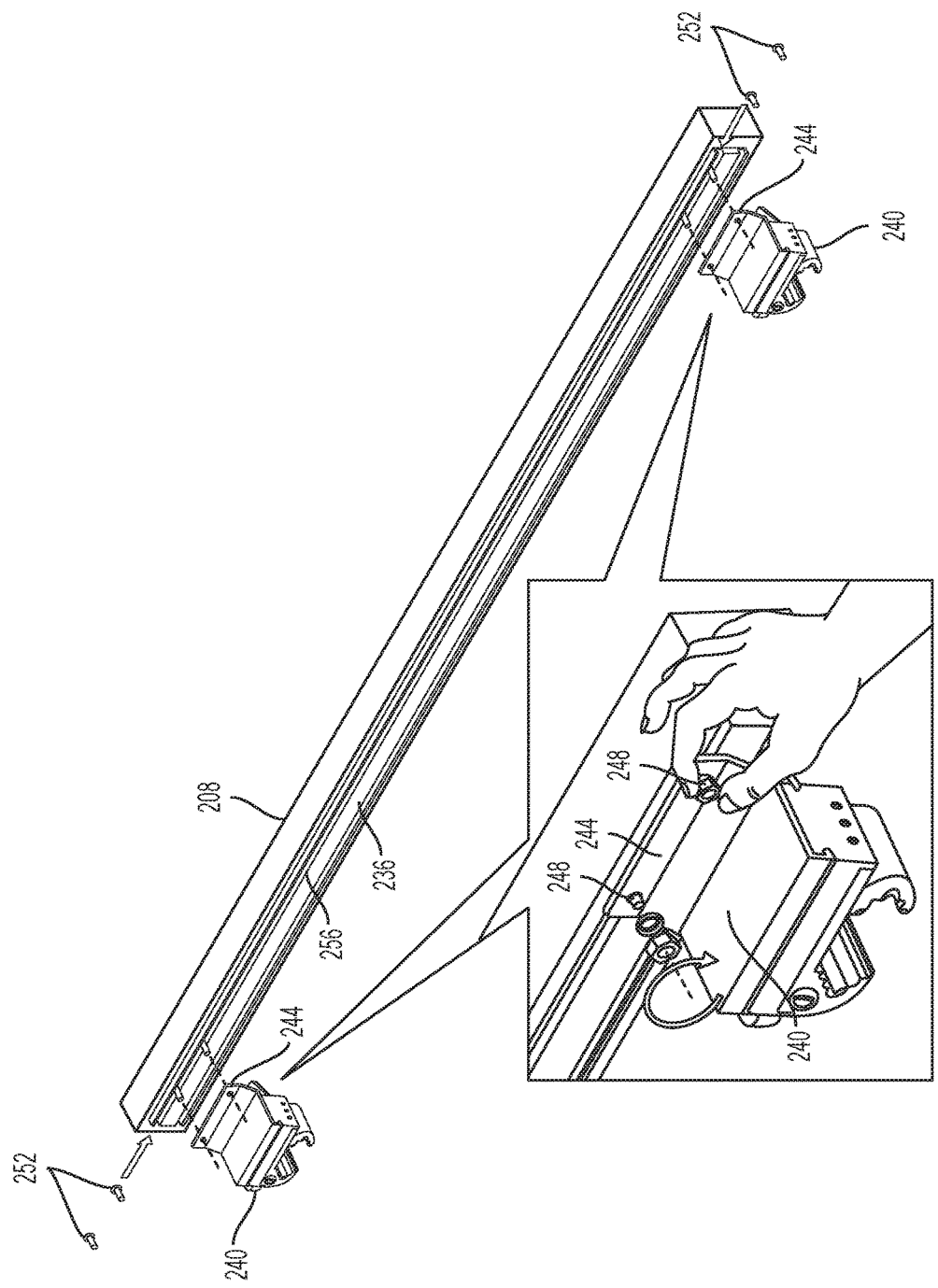
FIG. 12 is a schematic perspective view of a crossbar clamping device for connecting the awning system of FIG. 11 to crossbars mounted on top of a vehicle.

FIG. 12 shows details of case 208 and a preferred mechanism for connecting case 208 to crossbars 224. Case 208 includes base track 236 and clamps 240 which may be slidably adjusted along base track 236 to appropriate locations corresponding to the spacing between crossbars 224. Clamps 240 are in most respects similar to claims already shown and described above, except clamps 240 are configured for connection to a track from the side rather than from a vertical direction. More specifically, each of clamps 240 has an upwardly extending flange 244. Flange 244 has a plurality of apertures 248 for receiving bolts 252 for attaching clamp 244 to base track 236. When installing case 208 on crossbars 224, bolts 252 are inserted in inner track 256, and moved along the track to an appropriate location corresponding to the respective positions of crossbars 224, then tightened into place.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A vehicle rooftop tent apparatus, comprising:
   a tent,
   a platform supporting the tent, the platform having a bottom side,
   a rail mounted on the bottom side of the platform, the rail having a linear track parallel to the direction of vehicle travel, and
   a crossbar clamp assembly slidably mounted in the linear track, the crossbar clamp assembly including,
      a fixation device configured to stop movement of the crossbar clamp assembly in a selected position along the linear track,
      first and second jaws, and
      an actuator configured to adjust the spacing between the first and second jaws along an axis parallel to the linear track,
      wherein the fixation device includes a threaded shaft defining a rotational axis forming an acute angle with the direction of the linear track, the actuator has a handle, and the threaded shaft has a head portion configured for manipulation to fix the position of the crossbar clamp assembly in the linear track, the handle and the head portion being accessible for adjustment on a same end portion of the crossbar clamp assembly.

2. The vehicle rooftop tent apparatus of claim 1, wherein the head portion is positioned above the handle.

3. A vehicle rooftop tent apparatus, comprising:
   a tent,
   a platform supporting the tent, the platform having a bottom side,
   a rail mounted on the bottom side of the platform, the rail having a linear track parallel to the direction of vehicle travel, and
   a crossbar clamp assembly slidably mounted in the linear track, the crossbar clamp assembly including,
      a fixation device configured to stop movement of the crossbar clamp assembly in a selected position along the linear track,
      first and second jaws, and
      an actuator configured to adjust the spacing between the first and second jaws along an axis parallel to the linear track,
   wherein the fixation device includes a threaded shaft engaging a barrel nut, the crossbar clamp assembly having a ramp structure, the barrel nut sliding along the ramp structure as the threaded shaft is rotated.

4. The vehicle rooftop tent apparatus of claim 3, wherein the linear track has an internal surface, the fixation device stopping movement of the crossbar clamp assembly in the linear track when the barrel nut engages the internal surface of the linear track.

5. The vehicle rooftop tent apparatus of claim 4, wherein the internal surface of the linear track has plural recesses for receiving the barrel nut at different spaced locations along the linear track.

6. The vehicle rooftop tent apparatus of claim 1, wherein the crossbar clamp assembly has opposing lateral sides, each side having a lateral recess for engaging the linear track of the rail and permitting sliding of the crossbar clamp assembly within the linear track when the fixation device is disengaged.

7. A vehicle rack apparatus, comprising:
   a pair of crossbar assemblies, each crossbar assembly including a crossbar and a pair of couplers configured to secure the crossbar on top of a vehicle generally perpendicular to the direction of vehicle travel,
   a platform having a top side and a bottom side,
   a first rail mounted on the bottom side of the platform, the first rail having a linear track running parallel to the direction of vehicle travel, and
   a first clamp device slidably mounted in the linear track, the first clamp device including,
      a fixation device configured to stop movement of the first clamp device in a selected position in the linear track,
      first and second jaws configured to grip one of the crossbars, and
      an actuator configured to adjust the spacing between the first and second jaws along an axis parallel to the direction of vehicle travel,
   wherein the linear track has an internal surface, the fixation device including a threaded shaft directed obliquely toward the internal surface.

8. The vehicle rack apparatus of claim 7, further comprising:
   a second rail mounted on the bottom side of the platform parallel to the first rail, the second rail having a linear track running parallel to the direction of vehicle travel, and
   a second clamp device slidably mounted in the linear track of the second rail, the second clamp device including a fixation device configured to stop movement of the second clamp device in a selected position in the linear track of the second rail, and including third and fourth jaws configured to grip one of the crossbars.

9. The vehicle rack apparatus of claim 8, further comprising:
   a second clamp device slidably mounted in the linear track of the first rail, the second clamp device including a fixation device configured to stop movement of the second clamp device in a selected position in the linear track of the first rail, and including third and fourth jaws configured to grip one of the crossbars that is not gripped by the first clamp device.

10. The vehicle rack apparatus of claim 8, further comprising:
    a third clamp device mounted in the linear track of the first rail, and
    a fourth clamp device mounted in the linear track of the second rail.

11. The vehicle rack apparatus of claim 8, further comprising:
    a third rail mounted on the bottom side of the platform in line with the first rail, and a third clamp device slidably mounted in a linear track of the third rail, the third clamp device being configured to grip a crossbar, and
    a fourth rail mounted on the bottom side of the platform in line with the second rail, and a fourth clamp device slidably mounted in a linear track of the fourth rail, the fourth clamp device being configured to grip a crossbar.

12. The vehicle rack apparatus of claim 7, further comprising:
    a tent mounted on the top side of the platform.

13. The vehicle rack apparatus of claim 7, wherein the first clamp device includes an actuator configured to adjust the spacing between the first and second jaws along an axis parallel the direction of vehicle travel.

14. The vehicle rack apparatus of claim 7, wherein the threaded shaft engages a barrel nut, the first clamp device having a ramp structure and the barrel nut sliding along the ramp structure as the threaded shaft is rotated.

15. The vehicle rack apparatus of claim 14, wherein the fixation device stops movement of the first clamp device when the barrel nut engages the internal surface of the linear track.

* * * * *